US012783589B2

(12) United States Patent
Tenneti et al.

(10) Patent No.: US 12,783,589 B2
(45) Date of Patent: Nov. 3, 2026

(54) SUPPLEMENTING A SEARCH QUERY USING A LARGE LANGUAGE MODEL

(71) Applicant: Maplebear Inc., San Francisco, CA (US)

(72) Inventors: Tejaswi Tenneti, San Carlos, CA (US); Shishir Kumar Prasad, Fremont, CA (US); Haixun Wang, Bellevue, WA (US); Taesik Na, Issaquah, WA (US); Shrikar Archak, Newark, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/651,594

(22) Filed: Apr. 30, 2024

(65) Prior Publication Data

US 2025/0335521 A1 Oct. 30, 2025

(51) Int. Cl.
*G06F 16/9532* (2019.01)
*G06F 16/9538* (2019.01)

(52) U.S. Cl.
CPC ...... *G06F 16/9532* (2019.01); *G06F 16/9538* (2019.01)

(58) Field of Classification Search
CPC .......................... G06F 16/9532; G06F 16/9538
USPC ........................................................ 707/722
See application file for complete search history.

(56) References Cited

U.S. PATENT DOCUMENTS 8,725,756 B1 * 5/2014 Garg .................. G06F 16/2425 707/750
9,858,358 B1 * 1/2018 Garg .................. G06F 16/2425
11,609,942 B2 * 3/2023 Mital .................... G06F 16/953
11,809,508 B1 * 11/2023 Kallman ............. G06F 16/9537
11,941,678 B1 * 3/2024 Sadr ................... G06Q 30/0627
12,020,140 B1 * 6/2024 Mondlock ............ G06N 3/0455
12,038,958 B1 * 7/2024 Soubbotin ............. G06F 16/335
2006/0048076 A1 * 3/2006 Vronay ................. G06F 3/0482 715/850
2006/0224587 A1 * 10/2006 Zamir ............... G06F 16/24534
2009/0083226 A1 * 3/2009 Kawale ................. G06F 16/951
2016/0360382 A1 * 12/2016 Gross .................... G06F 3/0488
2020/0073938 A1 * 3/2020 Losalka ................ G06F 40/295
2020/0082009 A1 * 3/2020 Traynham ......... G06F 16/24578
2020/0104733 A1 * 4/2020 Bart ......................... G06N 3/02
2020/0159856 A1 * 5/2020 Mital .................. G06F 16/9038
2020/0311146 A1 * 10/2020 Guo .................... G06F 16/9532
2020/0311798 A1 * 10/2020 Forsyth .............. G06Q 30/0643
2021/0097063 A1 * 4/2021 Wan .................. G06F 16/24578
(Continued)

*Primary Examiner* — Alex Gofman
*Assistant Examiner* — Michael Le
(74) *Attorney, Agent, or Firm* — Fenwick & West LLP

(57) ABSTRACT

An online system retrieves engagement data associated with a base query made by a user for an item, the engagement data describing in part subsequent queries for other items following the base query in a single search session. The system generates a prompt that is provided to a machine learned model. The prompt instructs the machine learned model to generate one or more groups of related queries using the subsequent queries. The system selects a group of related queries from the one or more groups of related queries. The system queries an online catalog using at least some of the related queries from the selected group to determine supplemental search results. The system provides, to a user client device associated with the user, the supplemental search results.

13 Claims, 8 Drawing Sheets

600

(56) References Cited

U.S. PATENT DOCUMENTS

| | | | | |
|---|---|---|---|---|
| 2021/0286851 | A1* | 9/2021 | Kota | G06N 3/0455 |
| 2022/0058223 | A1* | 2/2022 | Yamagishi | G06F 16/9038 |
| 2022/0059088 | A1* | 2/2022 | Lee | G06N 3/08 |
| 2023/0044745 | A1* | 2/2023 | Minter | G06F 16/9537 |
| 2023/0195814 | A1* | 6/2023 | Minter | G06F 16/9536 707/722 |
| 2024/0020538 | A1* | 1/2024 | Socher | G06F 16/9538 |
| 2024/0037170 | A1* | 2/2024 | Peled | G06F 3/0481 |
| 2024/0086489 | A1* | 3/2024 | Sachindran | G06F 16/9532 |
| 2024/0104391 | A1* | 3/2024 | Higgins | G06F 16/3329 |
| 2024/0184834 | A1* | 6/2024 | McCann | G06F 16/9532 |
| 2024/0202221 | A1* | 6/2024 | Siebel | G06F 16/3347 |
| 2024/0202796 | A1* | 6/2024 | Sadr | G06Q 30/0621 |
| 2024/0220735 | A1* | 7/2024 | Gray | G06F 40/56 |
| 2024/0256615 | A1* | 8/2024 | Liu | G06F 16/9532 |
| 2024/0256618 | A1* | 8/2024 | Adada | G06F 40/20 |
| 2024/0256622 | A1* | 8/2024 | Abrams | G06F 16/9538 |
| 2024/0256757 | A1* | 8/2024 | Manavoglu | G06F 16/954 |
| 2024/0256841 | A1* | 8/2024 | Abrams | G06F 16/9538 |
| 2024/0281446 | A1* | 8/2024 | Bathwal | G06F 16/9538 |
| 2024/0281481 | A1* | 8/2024 | Yushkina | G06F 9/44526 |
| 2024/0281487 | A1* | 8/2024 | Bathwal | G06F 16/9558 |
| 2024/0289395 | A1* | 8/2024 | Zhou | G06F 16/9532 |
| 2024/0303441 | A1* | 9/2024 | Sobhy Deraz | G06T 11/206 |
| 2024/0354436 | A1* | 10/2024 | Mukherjee | G06F 16/3344 |
| 2024/0378223 | A1* | 11/2024 | Hamilton | G06F 16/35 |
| 2024/0403341 | A1* | 12/2024 | Berglund | G06F 16/3326 |
| 2024/0419922 | A1* | 12/2024 | Molitor | G06F 3/0482 |
| 2025/0094506 | A1* | 3/2025 | Sachindran | G06F 16/9536 |
| 2025/0124264 | A1* | 4/2025 | Wang | G06F 40/166 |
| 2025/0258819 | A1* | 8/2025 | Jain | G06F 40/279 |
| 2025/0278433 | A1* | 9/2025 | Gupta | G06F 16/90328 |

* cited by examiner

400

Base Query Column 410

Subsequent Query Column 420

Probability Column 430

| | Base Query | Subsequent Query | Probability |
|---|---|---|---|
| 1 | Sour Cream | Shredded Cheese | 40% |
| 2 | Sour Cream | Cream Cheese | 35% |
| 3 | Sour Cream | Salsa | 32% |
| 4 | Sour Cream | Butter | 30% |
| 5 | Sour Cream | Cheese | 28% |
| 6 | Sour Cream | Milk | 25% |
| 7 | Sour Cream | Eggs | 22% |
| 8 | Sour Cream | Lettuce | 19% |
| 9 | Sour Cream | Taco Seasoning | 18% |
| 10 | Sour Cream | Cheddar Cheese | 15% |
| ⋮ | | | |
| N-1 | Sour Cream | Onion | 6% |
| N | Sour Cream | Bread | 5% |

FIG. 4A

450

Grouping Column 460

Subsequent Queries Column 470

Explanations Column 480

| Grouping | Subsequent Queries | Explanations |
|---|---|---|
| Dairy Products | "shredded cheese", "cream cheese", "butter", "cheese", "milk", "cheddar cheese", "cottage cheese", "heavy cream", "parmesan cheese", "shredded cheddar" | Group all dairy products together for easier navigation. ***Customers who buy sour cream are likely to be interested in other dairy products***. Consider cross-promoting these items or offering bundle deals. |
| Meat and Poultry | "ground beef", "bacon", "chicken breast" | Group all meat and poultry items together. ***These items are often used in meals with sour cream***. Consider offering meal suggestions or recipe cards that include these items. |
| Mexican Food Ingredients | "salsa", "taco seasoning", "chips", "guacamole", "mexican cheese", "tortillas", "taco sauce", "tortilla chips", "refried beans", "taco shells", "black beans", "tortilla chips" | Group all Mexican food ingredients together. ***Sour cream is often used in Mexican cuisine***. Consider highlighting this category when customers purchase sour cream. |
| Condiments and Spreads | "mayo", "mayonnaise" | Group all condiments and spreads together. ***Customers who buy sour cream may also be interested in other condiments and spreads***. Consider cross-promoting these items. |
| Snacks | "doritos", "ruffles" | Group all snack items together. ***Customers who buy sour cream may also be interested in snacks***. Consider offering deals on these items when customers purchase sour cream. |
| Produce | "lettuce", "tomato", "shredded lettuce", "cilantro", "avocado", "onion", "green onion", "chives", "green onions", "broccoli", "jalapeno" | Place all fresh produce items together. ***These are often used in the same recipes as sour cream***. Consider offering recipe suggestions that include these items and sour cream. |
| Misc. | "eggs", "bread", "potatoes", "water", "corn", "onion soup mix", "bacon bits", "ranch seasoning" | These items do not fit neatly into the other categories but are frequently purchased with sour cream. Consider offering these items as 'frequently bought together' suggestions. |

FIG. 4B

SUPPLEMENTING A SEARCH QUERY USING A LARGE LANGUAGE MODEL

BACKGROUND

In the field of online search, various approaches have been developed to provide personalized search results. These approaches typically involve analyzing past user interactions to generate relevant results for additional items that may be of interest to the user, e.g., based on items with which the user or similar users have interacted. But existing approaches often lack the ability to effectively organize and explain the results, resulting in a less intuitive and personalized experience.

SUMMARY

In accordance with one or more aspects of the disclosure, expanded search results using a large language model (LLM) is described. The online system receives, from a user client device associated with a user, a base query for an item. Responsive to receiving the base query, the online system queries an online catalog using the base query to obtain a set of base search results.

To find additional or supplemental search results for the user, the online system retrieves information associated with a user. The online system may retrieve, e.g., engagement data associated with the base query. The engagement data may describe, e.g., subsequent queries for other items following the base query in a single search session, other items added to a shopping cart during the single search session subsequent to the base query, or some combination thereof. In some embodiments, the online system may also retrieve from a database one or more previously stored personas associated with the user.

To generate the supplemental search results, in one or more embodiments, the online system generates a prompt that is provided to a large language model. The prompt instructs the large language model to generate one or more groups of related queries based on the subsequent queries described in the retrieved engagement data. The large language model may be part of a separate artificial intelligence system, or it may be part of the online system. The online system provides the prompt to the large language model and then extracts, from the output of the large language model, the one or more groups of related queries.

In one or more embodiments, the online system selects a group of related queries from the one or more groups of related queries and then queries the online catalog using the selected group of related queries to determine supplemental search results. To provide the search results to the user, the online system generates a user interface that comprises the base search results along with the supplemental search results, and then provides the user interface to a user client device associated with the user, causing the client device to display the user interface.

BRIEF DESCRIPTION OF THE DRAWINGS

FIG. 4A illustrates an example table of engagement data of a user for a base query, according to one or more embodiments.

FIG. 4B illustrates a table of groupings of subsequent queries and corresponding explanations from a large language model, according to one or more embodiments.

DETAILED DESCRIPTION

Figure 1:
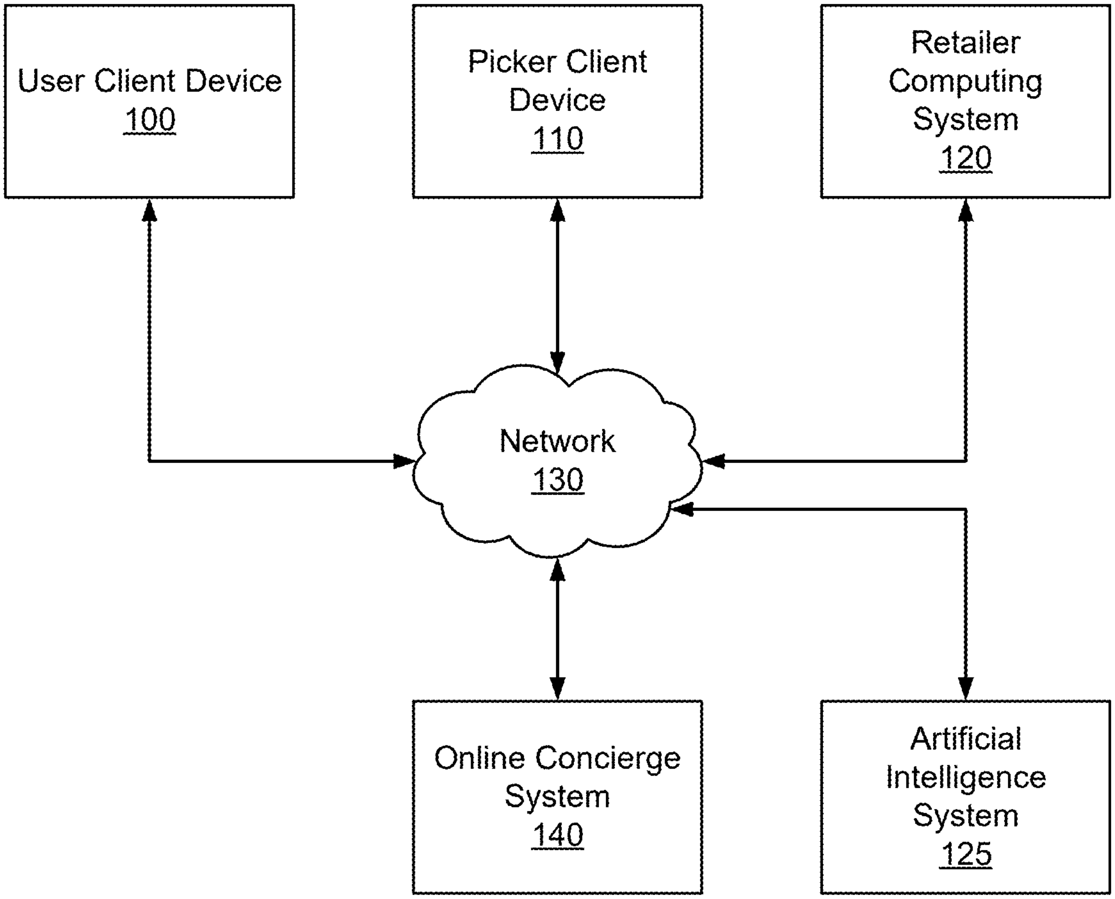
FIG. 1 illustrates an example system environment for an online system, in accordance with one or more embodiments.

FIG. 1 illustrates an example system environment for an online system, such as an online concierge system 140, in accordance with one or more embodiments. The system environment illustrated in FIG. 1 includes a user client device 100, a picker client device 110, a retailer computing system 120, an artificial intelligence (AI) system 125, a network 130, and an online concierge system 140. Alternative embodiments may include more, fewer, or different components from those illustrated in FIG. 1, and the functionality of each component may be divided between the components differently from the description below. For example, some or all of the functionality of the AI system 125 may be performed by the online concierge system 140. Additionally, each component may perform their respective functionalities in response to a request from a human, or automatically without human intervention.

As used herein, users, pickers, and retailers may be generically referred to as "users" of the online concierge system 140. Additionally, while one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items (e.g., from an online catalog) to be delivered to the user. An "item," as used herein, means a good or product that can be provided to the user through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

A user uses the user client device 100 to place an order with the online concierge system 140 as part of a search session. A search session describes a time period over which a user starts and completes an order. The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140. Responsive to receiving a query (e.g., "Chips") via the ordering interface, the user client device 100 provides the query to the online concierge system 140. A query is a word or phrase that corresponds to an item category or an item of interest to the user. The user client device 100 receives a response to the query from the online concierge system 140. The response may include, e.g., one or more item recommendations associated with the query, one or more supplemental search results (for items that do not correspond to the query, but are related to the query), one or more groups of supplemental search results, explanations for the groups, etc. The user client device 100 may present information from the received response via the ordering interface.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user such that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The AI system 125 is configured to apply prompts to one or more large language models to generate groups of related queries. The AI system 125 includes one or more large language models. The one or more large language models may be generative large language models. The AI system 125 may receive prompts from the online concierge system 140 to generate one or more groups of related queries using engagement data (e.g., subsequent queries made after a base query in a single search session and/or items added to a shopping cart following a base query in a single search session). In some embodiments, the prompts may also instruct the one or more large language models to provide an explanation for an organization of each of the one or more groups of related queries. In some embodiments, the prompts may also instruct the one or more large language models to generate the one or more groups of related queries based in part on one or more personas (e.g., "Pet Owner," "Vegetarian," etc.) that are associated with the user. In some embodiments, AI system 125 may be a third-party server that is independent and separate from the online concierge system 140.

In one or more embodiments, at least some of the one or more machine learned models are large language models (LLMs) that are trained on a large corpus of training data to generate outputs for the natural language processing (NLP) tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the AI system 125. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as one embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The user client device 100, the picker client device 110, the retailer computing system 120, the AI system 125, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provides portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 determines engagement data about users associated with the user client devices. The engagement data may describe for, a given base query, probabilities of the user subsequently making other specific queries for other items and/or probabilities of the user subsequently adding other specific items to the shopping cart, in a single search session. A base query is a query in a search session that after which subsequent queries in the search session and/or items (not corresponding to the base query) are added to the shopping cart in the search session, are associated with.

The online concierge system 140 may associate one or more personas with some or all of the users. A persona (Health Enthusiast, Luxury Lover, Vegetarian, Coffee Aficionado, Pet Owner, etc.) is a generic representation of search behavior of a user. The online concierge system 140 may generate a list of personas using the AI system 125. The online concierge system 140 may associate one or more personas from the list of personas with users based in part on their prior search behavior.

Note in some embodiments, the online concierge system 140 receives a query (e.g., "dog food") from the user client device 100. The online concierge system 140 may query the online catalog using the received query to determine corresponding item recommendations (e.g., PURINA) that correspond to the base query. The online concierge system 140 may instruct the user client device 100 to present (e.g., via the ordering interface) the corresponding item recommendations.

The online concierge system 140 generates prompts to provide to the AI system 125 (for providing to the one or more large language models). The prompts may be based on engagement data, and in some cases one or more personas associated with the user. A prompt may instruct the one or more large language models to generate one or more groups of related queries using engagement data of the user. In some embodiments, the online concierge system 140 may generate the prompts to instruct the one or more large language models to: provide an explanation for an organization of each of the one or more groups of related queries, generate the one or more groups of related queries based in part on one or more personas that are associated with the user, or some combination thereof.

The online concierge system 140 receives groups of related queries from the AI system 125. The online concierge system 140 may select, for a given user, one or more groups of related queries from one or more groups of related queries received from the AI system 125. The online concierge system 140 may query an online catalog using at least some of the related queries from the selected group to determine supplemental search results. The online concierge system 140 provides, to the user client device 100 associated with the user, the supplemental search results. The online concierge system 140 is described in further detail below with regards to FIG. 2.

Figure 2:
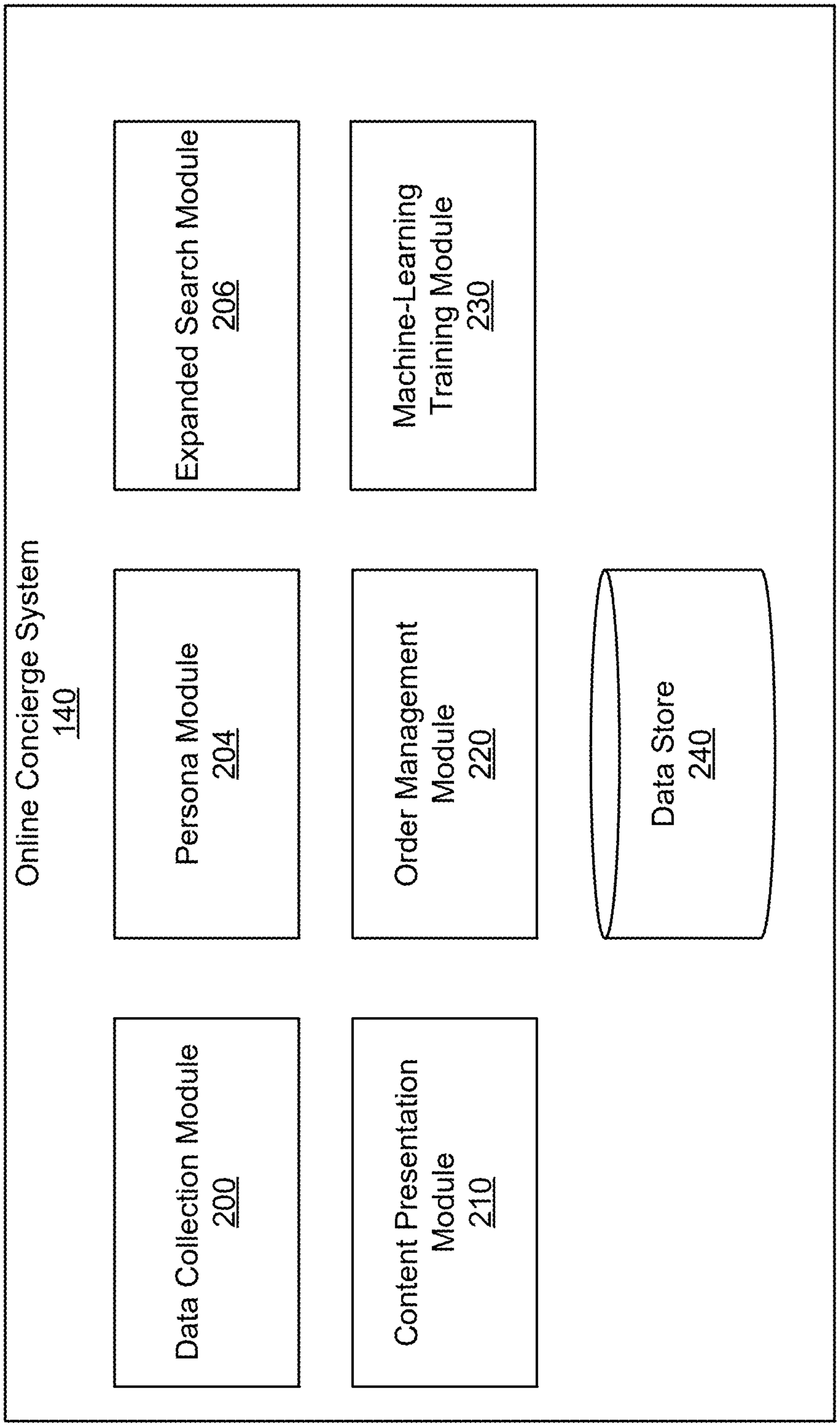
FIG. 2 illustrates an example system architecture for an online system, in accordance with one or more embodiments.

FIG. 2 illustrates an example system architecture for an online concierge system 140, in accordance with some embodiments. The system architecture illustrated in FIG. 2 includes a data collection module 200, a persona module 204, an expanded search module 206, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data includes engagement data and may also include a user's name, address, preferences, favorite items, stored payment instruments, some other data pertaining to user interactions with the online concierge system 140, or some combination thereof. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 monitors user actions during various search sessions. The monitored user actions may include, e.g., what queries were made during a search session, what items were added to the shopping cart during the same search session, what items were purchased during the same search session, or some combination thereof. The data collection module 200 processes the monitored user actions from the various search sessions to determine the engagement data. The engagement data may describe for, a given base query, probabilities of the user subsequently making other specific queries for other items and/or probabilities of the user subsequently adding other specific items to the shopping cart, in a single search session. A base query may be for an item or an item query. For example, given a base query of "sour cream" during a search session, engagement data may describe probabilities of the user making subsequent queries in the same search session for "shredded cheese," "cream cheese," and other queries the user had made after querying "sour cream" in one or more previous search sessions. In some embodiments, given a base query of "sour cream" during a search sessions, engagement data describes probabilities of the user adding other items ("shredded cheese," "cream cheese," etc.") to the shopping cart in the same search session where the other items were items that the user had added to the shopping cart after querying "sour cream" in one or more previous search sessions. Note that engagement data describes items and/or related search queries that do not correspond to a base query. Engagement data is further described below with respect to FIG. 4A.

Note in some embodiments, a query received from the user client device 100 may be new. In this case, there is no base query for the received query as it is the first time the data collection module 200 has received the query. Accordingly, there is no engagement data for the received query. In some embodiments, where the query is new to the user (i.e., there is no engagement data for the query), the data collection module 200 may compare the received query to existing base queries of the user, select a base query from the existing base queries based on the comparison, and retrieve engagement data associated with the selected base query. In some embodiments, the data collection module 200 may use, e.g., a nearest neighbor search to select a similar base query that has engagement data. For example, if the new search is for "vegan hotdogs," the data collection module 200 may perform a nearest neighbor search of base queries associated with the existing engagement data of the user. In this example, the data collection module 200 may find that a base query of "hot dogs" is the nearest neighbor, and retrieve the engagement data associated with the base query ("hot dogs").

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order.

The persona module 204 may generate a list of different personas. A persona is a generic representation of a user that is based on their search behavior. A persona may be, e.g., Health Enthusiast, Luxury Lover, Tech Savvy, Busy Parent, Fitness Fanatic, Organic Foodie, Vegan/Vegetarian, Gourmet Chef, Busy Parent, Gluten-free Shopper, Party Planner, Comfort Food Lover, Seafood Lover, Wine Connoisseur, Coffee Aficionado, Pet Owner, Baby Care Provider, Baker, International Cuisine Lover, Quick Meals Shopper, Breakfast Lover, Dairy-free Shopper, Allergy-conscious Shopper, Fresh Produce Fanatic, Meat Lover, Non-GMO Shopper, Spice Explorer, Hydration Focused, Snack Adventurer, Keto Diet Follower, High-Protein Shopper, Plant-Based Protein Seeker, Lunchbox Packer, Smoothie Maker, Frozen Food Fan, Low-Sodium Shopper, Nut-Free Shopper, Grill Master, Home Entertainer, Sugar-Free Shopper, DIY Cocktail Mixer, Artisanal Cheese Lover, Craft Beer Enthusiast, Tea Lover, Paleo Diet Follower, Supplements User, or some other generic representation of the user that is based on their search behavior. The persona module 204 may generate a list of personas, e.g., the one or more large language models of the AI system 125 and/or some other model. For example, the persona module 204 may generate a prompt for a model to generate different personas based on different respective search behaviors. In this manner, each persona may map to different search behavior.

The persona module 204 may associate one or more personas with some or all of the users. The persona module 204 may associate one or more personas from the list of personas with a user based in part on their prior search behavior. For example, the persona module 204 may compare search behavior of a user to search behaviors of various personas, and associate one or more personas with the user based on the comparison. For example, a Vegetarian persona may have search behavior that includes fruits, vegetables, meatless protein and does not include meat. The persona module 204 may compare a profile of a user to the search behavior of the Vegetarian persona, and if the profiles are within a threshold similarity, associate the Vegetarian persona with the user.

The one or more personas associated with the user may be used to better target item recommendations to the user. For example, they may be used in prompts for the generation of the one or more groups of related search queries, to more closely align the generated groups with the search behaviors of the user. In other examples, the one or more personas associated with a user may be used to filter information output from the one or more large language models. Accordingly, personas may mitigate chances of particular items and/or item categories being recommended to the user (e.g., recommending peanut butter to a person with a peanut allergy).

The expanded search module 206 generates prompts to provide to the AI system 125 (for providing to the one or more large language models). In some embodiments, the expanded search module 206 generates the prompts responsive to receiving a base query from the user client device 100. In other embodiments, the expanded search module 206 may generate the prompts before receiving a base query. The prompts may be based on engagement data. In some embodiments the prompts are also based on one or more personas associated with the user. A prompt may instruct the one or more large language models to generate one or more groups of related queries using engagement data of the user. In some embodiments, the expanded search module 206 may generate the prompts to also instruct the one or more large language models to: provide an explanation for an organization of each of the one or more groups of related queries, generate the one or more groups of related queries based in part on one or more personas that are associated with the user, or some combination thereof. The expanded search module 206 receives groups of related queries from the AI system 125.

The content presentation module 210 selects content for presentation to a user. For example, the content presentation module 210 selects which items to present to a user while the user is placing an order. The content presentation module 210 generates and transmits the ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the user client device 100. A search query is text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a user based on whether the predicted availability of the item exceeds a threshold.

The content presentation module 210 may select, for a given user, one or more groups of related queries from one or more groups of related queries received from the AI system 125. In some embodiments, the content presentation module 210 may select all of the one or more groups of related queries. In other embodiments, the content presentation module 210 may for example, score the one or more groups of queries using one or more of the techniques described above, and select groups that have at least some threshold score value.

The content presentation module 210 may query an online catalog using some or all of the related queries from the selected one or more groups to determine supplemental search results. Note that the supplemental search results are for items that are different from items associated with the base query. For example, a base query may be for "tortilla chips," and the supplemental search result may be for "salsa." The content presentation module 210 provides, to the user client device 100 associated with the user, the supplemental search results.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of their order. In some embodiments, the order management module 220 computes an estimated time of arrival for the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine learning training module 230 trains machine learning models used by the online concierge system 140, and in some embodiments, machine learning models used by the AI system 125. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores user data (e.g., engagement data), base queries, item data, order data, picker data, personas, information (e.g., groups of related queries) received from the AI system 125, some other data that is used by the online concierge system 140, or some combination thereof. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3A:
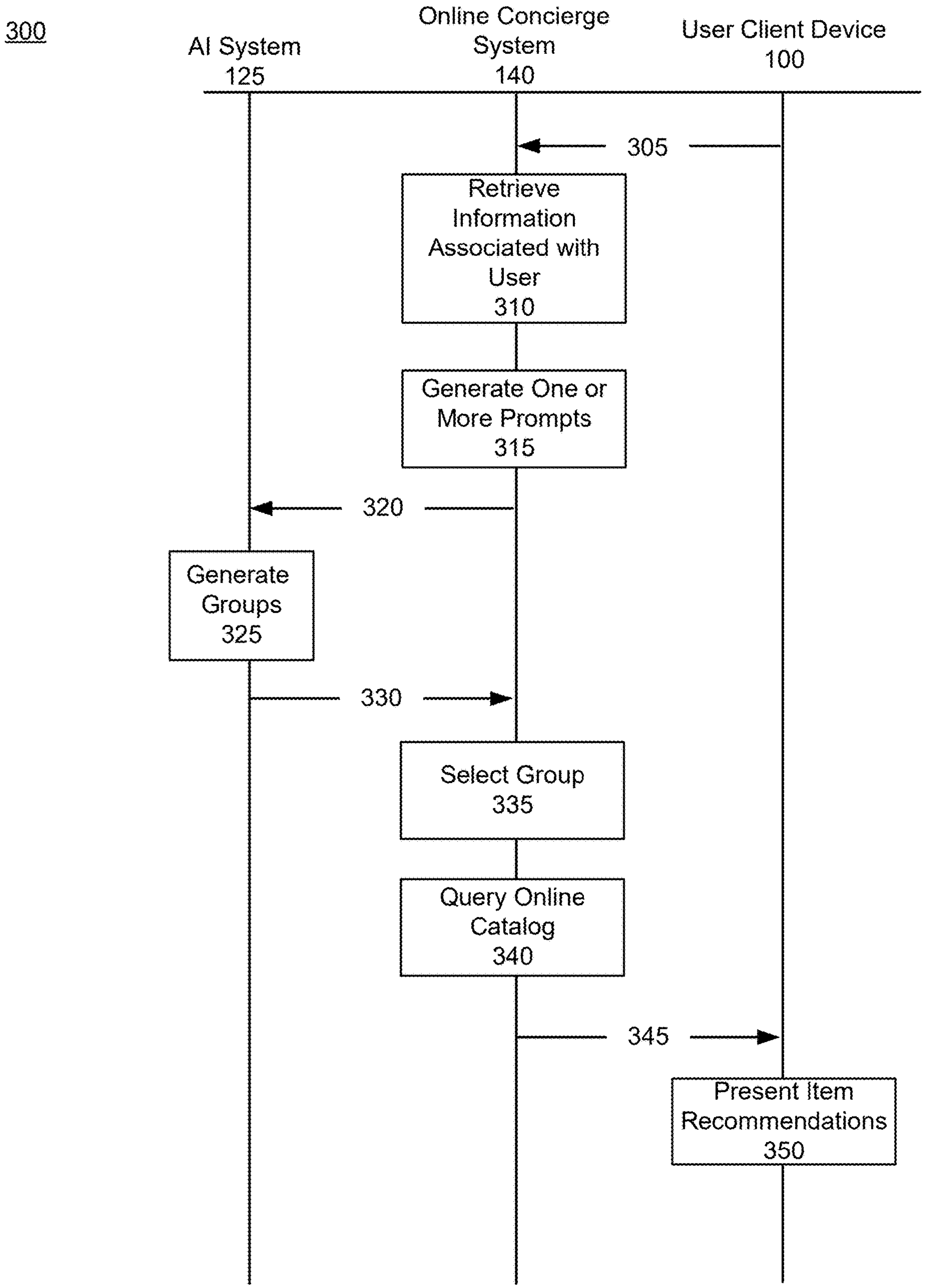
FIG. 3A is an example sequence diagram describing expanded item recommendation using a large language model, in accordance with some embodiments.

FIG. 3A is an example sequence diagram 300 describing expanded item recommendation using an LLM, in accordance with some embodiments. Alternative embodiments may include more, fewer, or different interactions from those illustrated in FIG. 3A, and the steps may be performed in a different order from that illustrated in FIG. 3A.

The user client device 100 provides 305 a search query to the online concierge system 140. A user may use the user client device 100 to generate the search query. The search query may be, e.g., "sour cream."

The online concierge system 140 retrieves 310 information associated with a user. The online concierge system 140 may retrieve the information from the user data stored in a data store (e.g., the data store 240). In some embodiments, the information includes engagement data for a user associated with a base query that the query matches. In some embodiments, where the query is new to the user (i.e., there is no engagement data for the query), the online concierge system 140 may compare (e.g., via nearest neighbor search) the received query to existing base queries of the user, select a base query from the existing base queries based on the comparison, and retrieve engagement data associated with the selected base query. In some embodiments the retrieved information may also include persona(s) associated with the user.

The online concierge system 140 may generate 315 one or more prompts for one or more large language models of the AI system 125. The one or more prompts instruct the large language model to generate one or more groups of related queries using the subsequent queries. In some embodiments, the one or more prompts instruct the large language model to: provide an explanation for an organization of each of the one or more groups of related queries, generate the one or more groups of related queries based in part on the persona (s) associated with the user, or some combination thereof. The online concierge system 140 provides 320 the one or more prompts to the AI system 125 (for providing to the large language model).

Responsive to receiving the one or more prompts, the AI system 125 applies the prompts to the one or more large language models to generate 325 one or more groups of related queries using the subsequent queries, and depending on the one or more prompts, also provide an explanation for an organization of each of the one or more groups of related queries, generate the one or more groups of related queries based in part on the persona(s) associated with the user, or some combination thereof.

The AI system 125 provides 330 information generated by the one or more large language models to the online concierge system 140. The generated information includes, the one or more groups of related queries, and in some embodiments, also includes explanations for the organizations of each of the one or more groups of related queries.

The online concierge system 140 selects 335 some or all of the one or more groups of related queries. In some embodiments, the online concierge system 140 may select all of the one or more groups of related queries. In other embodiments, the online concierge system 140 may for example, score the one or more groups of queries and select groups based on the scoring.

The online concierge system 140 queries 340 an online catalog using at least some of the related queries from the selected one or more groups to determine supplemental search results. The online concierge system 140 may query the online catalog using some or all of the related queries from the selected one or more groups to determine supplemental search results (e.g., "shredded cheese," "cream cheese," etc.). The online concierge system 140 may also query the online catalog using the search query (e.g., "sour cream") provided at step 305 (matches the base query) to determine corresponding item recommendations (e.g., "Island Farm's Sour Cream").

The online concierge system 140 provides 345 to the user client device 100 the supplemental search results and the corresponding item recommendations. The online concierge system 140 may instruct the user client device 100 to present the corresponding item recommendations via an ordering interface of the user client device 100. In some embodiments, online concierge system 140 instructs the user client device 100 to present the supplemental search results via the carousel. In some embodiments, the online concierge system 140 may instruct the user client device 100 to present the supplemental search results, by group, within the carousel. In some embodiments, the online concierge system 140 may instruct the user client device 100 to present the explanations for the organization of the groups (e.g., as part of the carousel).

The user client device 100 presents 350 the supplemental search results and the corresponding item recommendations. The user client device 100 presents the supplemental search results and the corresponding item recommendations via the ordering interface in accordance with instructions from the online concierge system 140. Note the corresponding item recommendations are to respond to the original search query of the user. In contrast, the supplemental search result corresponds to search queries (for some other item and/or item category) the user had made subsequent to the base query in at least one previous search session and/or items the user had added to their shopping cart subsequent to the base query in the at least one previous search session. In this manner, the online concierge system 140 expands item recommendations from the initial search query to include other potential items of interest.

Moreover, by including explanations as to organization of the groups in the presented content, the online concierge system 140 may provide clarity to the user regarding why a recommendation for an item is being presented when it does not directly correspond to the original search query. For example, if the original search query from the user was for “strawberries,” using the process described above may result in a “Alcoholic Drinks” group of related queries and a “Desserts” group of related queries, where the Alcoholic Drinks group may include supplemental search results for Tequila, and the Desserts group may include a supplemental search result for whipped cream. The user may originally have been looking to use the strawberries in strawberry margaritas, so the user would logically see the Tequila item recommendation. However, the whipped cream item recommendation may seem out of place to the user if they were thinking of using the strawberries in margaritas. By including an explanation for the grouping (e.g., Strawberries and cream make an excellent dessert) it may provide clarity to the user about why the whipped cream was recommended. And increased clarity may also encourage the user to add the whipped cream to the cart.

Note that the sequence diagram 300 begins with receiving a search query from the user client device 100. In other embodiments, some or all of the engagement data may be pre-processed for some or all of the base queries associated with the user. Note that by pre-processing the engagement data, the online concierge system 140 is able to mitigate having to coordinate with the one or more large language models (e.g., of the AI system 125) during an active search session with the user.

Figure 3B:
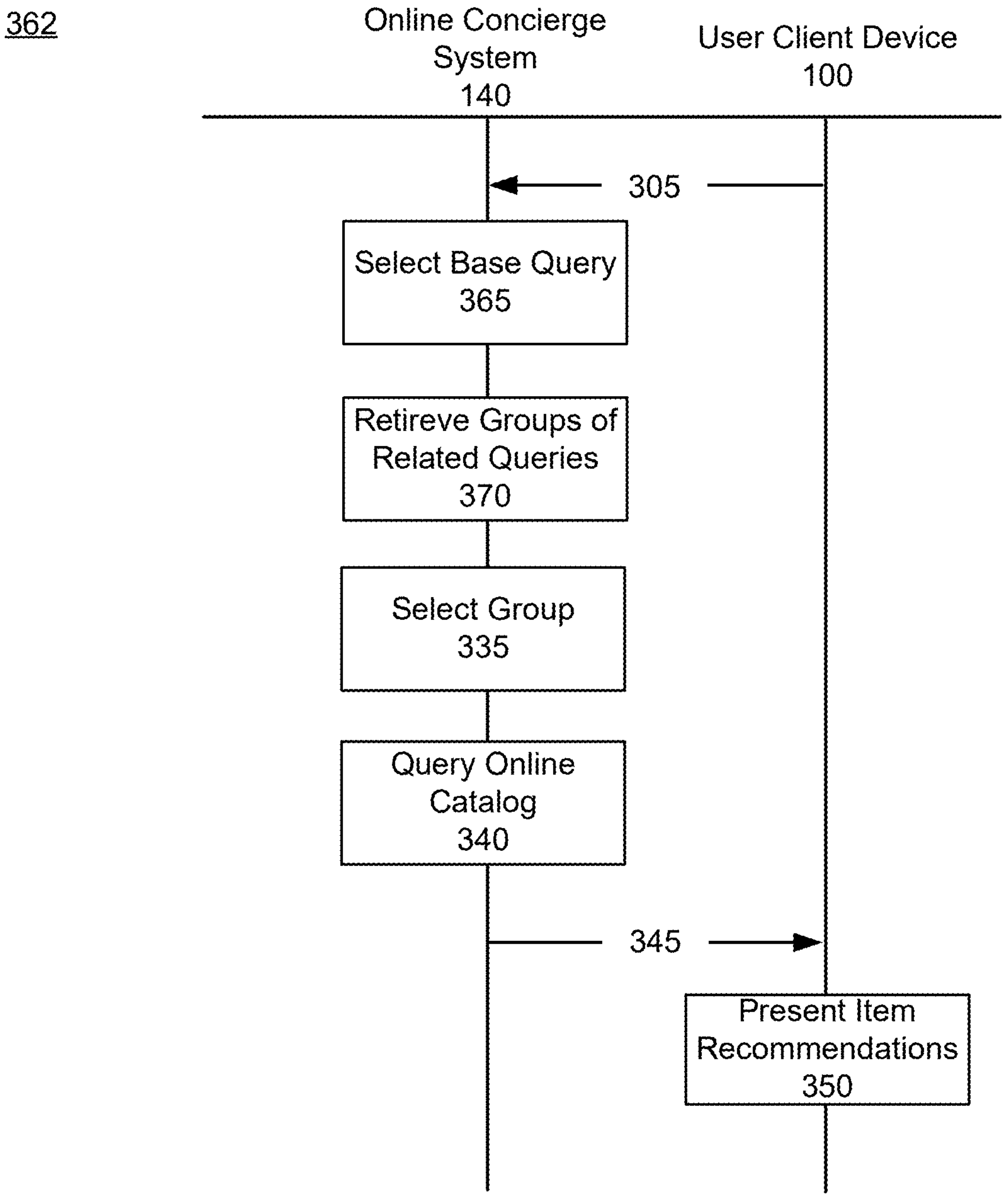
FIG. 3B is an example sequence diagram describing expanded item recommendation using pre-processed groups of related queries, in accordance with some embodiments.

FIG. 3B is an example sequence diagram 362 describing expanded item recommendation using pre-processed groups of related queries, in accordance with some embodiments. Alternative embodiments may include more, fewer, or different interactions from those illustrated in FIG. 3B, and the steps may be performed in a different order from that illustrated in FIG. 3B.

The sequence diagram is substantially the same as that in FIG. 3B, except that online concierge system 140 has pre-processed (steps 310, 315, 320, 325, 330 of the sequence diagram 300) engagement data for the user to determine groups of related queries that are associated with respective base queries. The pre-processing occurs before the user client device 100 provides 305 a search query.

The online concierge system 140 selects 365 a base query based on the received search query. For example, the online concierge system 140 may compare the received search query to existing base queries of the user that are associated with various groups of related queries, and select a base query from the existing base queries based on the comparison.

The online concierge system 140 retrieves 370 the groups of related queries that are associated with the selected base query. The online concierge system 140 may proceed with steps 335-350 as described above with regard to the sequence diagram 300.

FIG. 4A illustrates an example table 400 of engagement data of a user for a base query, according to one or more embodiments. In this example, the table 400 includes a base query 410 column, a subsequent query column 420, and a probability column 430. In other embodiments, the table 400 may have one or more different and/or additional columns. The table 400 associates the base query with other subsequent queries (for items and/or item categories) and probabilities of the user making the subsequent queries sometime after the base query in a single search session. In this example, there are N subsequent queries in the subsequent query column 420, where N is an integer. The probability column 430 provides a probability that a subsequent query is made by the user in a same search session following the user making the base query. For example, according to the table 400, for a base query of “sour cream” there is a 40% chance that the user makes a subsequent query of “shredded cheese” in the same search session.

An online concierge system (e.g., the online concierge system 140) generates the table 400 using monitored user actions from prior search sessions of the user. For example, the online concierge system may retrieve for each prior search session of the user what queries were made subsequent to the base query. The online concierge system may determine respective probabilities of the user making a query subsequent to the base query using the retrieved information.

Note while the table 400 is in the context of subsequent queries, in other embodiments, in addition to or in alternative to the subsequent query column 420, the table 400 may include a subsequent item column. The subsequent item column may include items the user subsequently added to their shopping cart after making the base query.

FIG. 4B illustrates a table 450 of groupings of subsequent queries and corresponding explanations from a large language model, base query, according to one or more embodiments. In this example, the table 450 includes a grouping column 460, a subsequent queries column 470, and an explanations column 480. In other embodiments, the table 450 may have some other columns. The table 450 may be output from a large language model responsive to receiving one or more prompts from an online concierge system (e.g., the online concierge system 140) that are based in part on the table 400 of FIG. 4A. In some embodiments, the large language model is part of an AI system (e.g., the AI system 125). In other embodiments, the large language model is part of the online concierge system.

The grouping column 460 identifies various groups generated by the large language model in response to the one or more prompts. In the illustrated example, large language model generated nine different groups (e.g., Dairy Products, Meat and Poultry, etc.) based on the data from table 400.

The subsequent queries column 470 identifies which subsequent queries are associated with each group. For example, the group of “Mexican Food Ingredients” is associated with subsequent queries of “salsa,” “taco seasoning,” “chips,” “guacamole,” “mexican cheese,” “tortillas,” “taco sauce,” “tortilla chips,” “refried beans,” “taco shells,” “black beans,” and “tortilla chips.”

The explanations column 480 provides respective explanations for an organization of each group. For example, the group of “Mexican Food Ingredients” is associated with an explanation of “Group all Mexican food ingredients together. Sour cream is often used in Mexican cuisine. Consider highlighting this category when users purchase sour cream.” Note in this embodiment, the explanations include a portion that may be relevant to the user (bolded) and a portion that may be relevant to the online concierge system (non-bolded text after the bolded text in the explanations). In some embodiments, the online concierge system may present the information relative to the user with corresponding supplemental search results.

Figure 5:
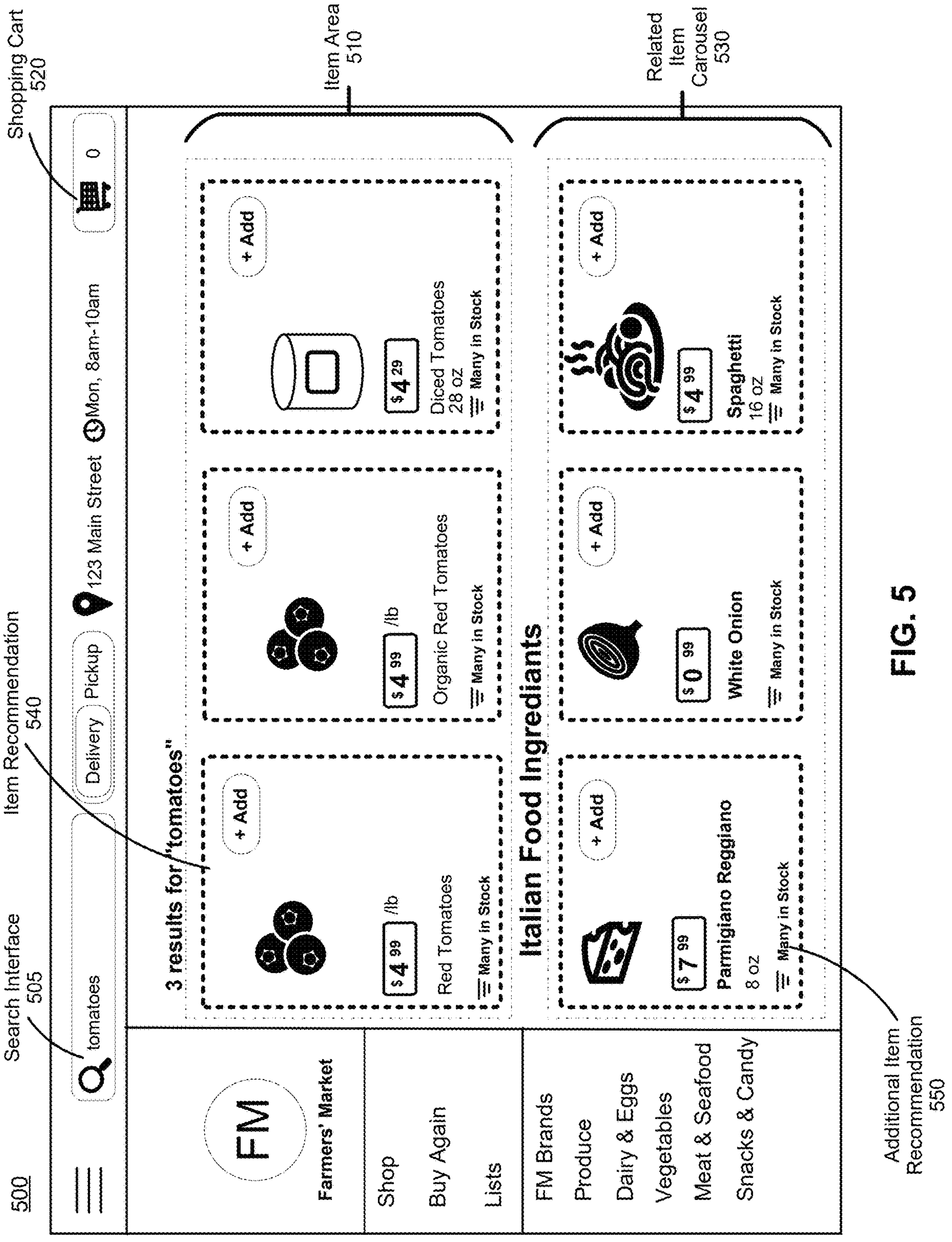
FIG. 5 illustrates an example ordering interface associated with a storefront, in accordance with some embodiments.

FIG. 5 illustrates an example ordering interface 500 associated with a storefront, in accordance with some embodiments. The ordering interface 500 is an embodiment of the ordering interface described above with regard to FIG. 1-3B. The ordering interface 500 may be presented on a user client device (e.g., the user client device 100). The ordering interface 500 is a user interface that presents food items that are available to purchase from the storefront. The storefront is a portal used by a retailer (e.g., retailer computing system 120) to sell one or more items. For example, the retailer in FIG. 5 is "Farmers' Market." In the illustrated embodiment, the ordering interface 500 includes at least a search interface 505, an item area 510, a shopping cart 520, and a related item carousel 530. In other embodiments, the ordering interface 500 includes different or additional elements. In addition, the functions may be distributed among the elements in a different manner than described.

The search interface 505 is used to search a portion of the online catalog that is specific to the retailer. In the illustrated embodiment, a user associated with the user client device had provided a query of "tomatoes" to the user client device via the search interface 505. The user client device provides the search query to an online concierge system (e.g., the online concierge system 140). The online concierge system processes the query as described above with regard to FIGS. 1-3B and provides information (e.g., item recommendations) to be presented in the item area 510 and the related item carousel 530.

The item area 510 presents information describing various items that are for sale. In the illustrated example, the item area 510 is presenting item recommendations that correspond to the search query ("tomatoes"). For example, as shown the item area 510 presents an item recommendation 540 for "Red Tomatoes" along with several other item recommendations.

The related item carousel 530 presents supplemental search results (e.g., supplemental search result 550) that are generated by the online concierge system 140 using related queries from a group of related queries. In the illustrated embodiment, the group is "Italian Food Ingredients," and the associated item recommendations are for items that the user had in previous search sessions added to the shopping cart 520 after making a query for "tomatoes." In embodiments, where there are multiple groups, the ordering interface 500 may allow the user to scroll through the various groups to see supplemental search results for each group. While not shown, in some embodiments, the ordering interface 500 may also include an explanation (received from the online concierge system 140) for the organization of the group.

Figure 6:
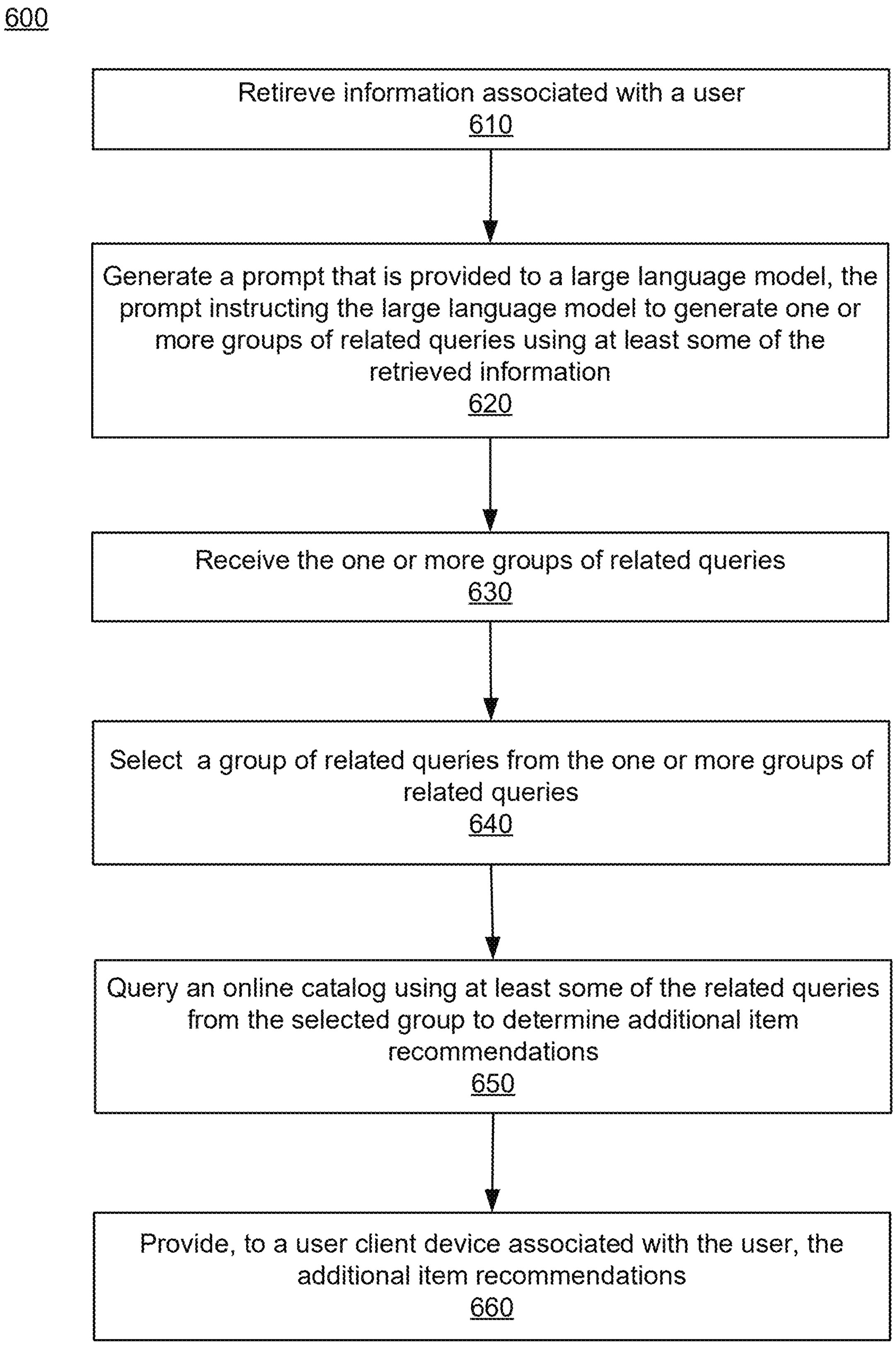
FIG. 6 is a flowchart for a method of performing expanded item recommendation using a large language model, in accordance with some embodiments.

FIG. 6 is a flowchart for a method 600 of performing expanded item recommendation using a LLM, in accordance with some embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 140). Additionally, each of these steps may be performed automatically by the online concierge system without human intervention.

The online concierge system retrieves 610 information associated with a user. The online concierge system may retrieve the information from the user data stored in a data store (e.g., the data store 240). For example, the online concierge system may retrieve engagement data (e.g., for the base query, probabilities of the user subsequently making other specific queries for other items and/or probabilities of the user subsequently adding other specific items to the shopping cart) associated with a base query (e.g., "sour cream") for an item from a user. In some embodiments, the online concierge system may also retrieve one or more personas associated with the user.

The online concierge system generates 620 a prompt that is provided to a large language model. In some embodiments, the prompt instructs the large language model to generate one or more groups of related queries using at least some of the retrieved information (e.g., the subsequent queries). In some embodiments, the prompt also instructs the large language model to provide an explanation for an organization of each of the one or more groups of related queries, generate the one or more groups of related queries based in part on the persona(s) associated with the user, or some combination thereof. The online concierge system may provide the prompt to an AI system (e.g., the AI system 125) which provides the prompt to the large language model. In some embodiments, the large language model of the AI system is part of the online concierge system, and the online concierge system directly provides the prompt to the large language models.

The online concierge system receives 630 the one or more groups of related queries generated by the prompt being applied to the large language model. In some embodiments, the online concierge system receives the one or more groups of related queries from the AI system. In embodiments where the large language model is part of the concierge system, the online concierge system receives the one or more groups of related queries from the large language model.

The online concierge system selects 640 a group of related queries from the one or more groups of related queries. In some embodiments, the online concierge system may select all of the one or more groups of related queries. In other embodiments, the online concierge system may for example, score the one or more groups of related queries and select groups based on the scoring. Note in some embodiments, the online concierge may filter related queries of the selected group in accordance with a search behavior of the one or more personas of the user. In this manner, for example, high calorie desserts can be filtered out of supplemental search results for a user with a "Healthy Lifestyle" persona.

The online concierge system queries 650 an online catalog using at least some of the related queries from the selected group to determine supplemental search results. The online concierge system may query the online catalog using some or all of the related queries from the selected group to determine supplemental search results (e.g., "shredded cheese," "cream cheese," etc.).

The online concierge system provides 660, to a user client device (e.g., the user client device 100) associated with the user, the supplemental search results. In some embodiments, online concierge system instructs the user client device to present the supplemental search results via a carousel on an ordering interface of the user client device. In some embodiments, the online concierge system may instruct the user client device to present the supplemental search results, by group, within the carousel. In some embodiments, the online concierge system may instruct the user client device to present the explanations for the organization of the groups (e.g., as part of the carousel).

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

- receiving, from a device associated with a user and during a first search session of the user, a first query for a first item;
- monitoring, during the first search session, actions by the user including making subsequent queries for other items via the device associated with the user after the user made the first query;
- processing information about the monitored actions to generate engagement data of the user associated with the first query, the engagement data including information about the subsequent queries;
- receiving, from the device associated with the user and during a second search session of the user, a second query for a second item;
- identifying, by comparing the second query to the first query, the first query as a base query;
- querying an online catalog using the base query to obtain a set of base search results;
- retrieving, using the base query, the engagement data including the information about the subsequent queries;
- generating a prompt for a generative model, the prompt instructing the generative model to generate one or more groups of related queries based on the subsequent queries described in the retrieved engagement data, the prompt further including instructions for the generative model to generate an explanation about each of the one or more groups of related queries;
- providing the prompt to the generative model, the generative model providing an output in response to the prompt;
- extracting, from the output of the generative model, the one or more groups of related queries;
- selecting a group of related queries from the one or more groups of related queries;
- querying the online catalog using the selected group of related queries to determine supplemental search results;
- generating a user interface that includes the set of base search results along with the supplemental search results, wherein generating the user interface comprises:
  - adding, to a first area of the user interface, a first group of items that are relevant to the set of base search results,
  - adding, to a second area of the user interface that is separate from the first area, a second group of items that are relevant to the supplemental search results, and
  - including, in association with each of the second group of items, the generated explanation about each of the one or more groups of related queries; and
- providing the user interface to the device associated with the user, causing the device associated with the user to display the user interface.

2. The method of claim 1, wherein generating the user interface further comprises:

generating a first carousel that includes the first group of items; and generating a second carousel that includes the second group of items.

3. The method of claim 1, further comprising:

retrieving a persona that is associated with the user, the persona selected from a set of different personas that are each associated with different search behaviors, wherein generating the prompt comprises including, in the prompt, instructions for the generative model to generate the one or more groups of related queries based in part on the persona.

4. The method of claim 1, further comprising:

querying the online catalog using the base query to determine corresponding item recommendations, wherein the corresponding item recommendations and the supplemental search results for the selected group are presented on the device associated with the user on an ordering interface.

5. The method of claim 1, further comprising:

retrieving a persona that is associated with the user, the persona selected from a set of different personas that are each associated with different search behaviors; and filtering related queries of the selected group in accordance with a search behavior of the persona.

6. The method of claim 1, further comprising:

retrieving data describing items that do not correspond to the base query that are subsequently added to a cart of the user in the first search session, and wherein the generated prompt further instructs the generative model to generate the one or more groups of related queries using the subsequent queries and the items.

7. A computer program product comprising a non-transitory computer readable storage medium having instructions encoded thereon that, when executed by a processor of a computer system, cause the computer system to perform steps comprising:

receiving, from a device associated with a user and during a first search session of the user, a first query for a first item;

monitoring, during the first search session, actions by the user including making subsequent queries for other items via the device associated with the user after the user made the first query;

processing information about the monitored actions to generate engagement data of the user associated with the first query, the engagement data including information about the subsequent queries;

receiving, from the device associated with the user and during a second search session of the user, a second query for a second item;

identifying, by comparing the second query to the first query, the first query as a base query;

querying an online catalog using the base query to obtain a set of base search results;

retrieving, using the base query, the engagement data including the information about the subsequent queries;

generating a prompt for a generative model, the prompt instructing the generative model to generate one or more groups of related queries based on the subsequent queries described in the retrieved engagement data, the prompt further including instructions for the generative model to generate an explanation about each of the one or more groups of related queries;

providing the prompt to the generative model, the generative model providing an output in response to the prompt;

extracting, from the output of the generative model, the one or more groups of related queries;

selecting a group of related queries from the one or more groups of related queries;

querying the online catalog using the selected group of related queries to determine supplemental search results;

generating a user interface that includes the set of base search results along with the supplemental search results, wherein generating the user interface comprises:

adding, to a first area of the user interface, a first group of items that are relevant to the set of base search results, adding, to a second area of the user interface that is separate from the first area, a second group of items that are relevant to the supplemental search results, and including, in association with each of the second group of items, the generated explanation about each of the one or more groups of related queries; and providing the user interface to the device associated with the user, causing the device associated with the user to display the user interface.

8. The computer program product of claim 7, further comprising instructions that when executed cause the computer system to perform steps comprising:

generating a first carousel that includes the first group of items; and generating a second carousel that includes the second group of items.

9. The computer program product of claim 7, further comprising instructions that when executed cause the computer system to perform steps comprising:

retrieving a persona that is associated with the user, the persona selected from a set of different personas that are each associated with different search behaviors, wherein generating the prompt comprises including, in the prompt, instructions for the generative model to generate the one or more groups of related queries based in part on the persona.

10. The computer program product of claim 7, further comprising instructions that when executed cause the computer system to perform steps comprising:

querying the online catalog using the base query to determine corresponding item recommendations, wherein the corresponding item recommendations and the supplemental search results for the selected group are presented on the device associated with the user on an ordering interface.

11. The computer program product of claim 7, further comprising instructions that when executed cause the computer system to perform steps comprising:

retrieving a persona that is associated with the user, the persona selected from a set of different personas that are each associated with different search behaviors; and filtering related queries of the selected group in accordance with a search behavior of the persona.

12. The computer program product of claim 7, further comprising instructions that when executed cause the computer system to perform steps comprising:

retrieving data describing items that do not correspond to the base query that are subsequently added to a cart of the user in the first search session, and wherein the generated prompt further instructs the generative model to generate the one or more groups of related queries using the subsequent queries and the items.

13. A computer system comprising:

a processor; and a non-transitory computer readable storage medium having instructions encoded thereon that, when executed by the processor, cause the processor to perform steps comprising:

receiving, from a device associated with a user and during a first search session of the user, a first query for a first item;

monitoring, during the first search session, actions by the user including making subsequent queries for other items via the device associated with the user after the user made the first query;

processing information about the monitored actions to generate engagement data of the user associated with the first query, the engagement data including information about the subsequent queries;

receiving, from the device associated with the user and during a second search session of the user, a second query for a second item;

identifying, by comparing the second query to the first query, the first query as a base query;

querying an online catalog using the base query to obtain a set of base search results;

retrieving, using the base query, the engagement data including the information about the subsequent queries;

generating a prompt for a generative model, the prompt instructing the generative model to generate one or more groups of related queries based on the subsequent queries described in the retrieved engagement data, the prompt further including instructions for the generative model to generate an explanation about each of the one or more groups of related queries;

providing the prompt to the generative model, the generative model providing an output in response to the prompt;

extracting, from the output of the generative model, the one or more groups of related queries;

selecting a group of related queries from the one or more groups of related queries;

querying the online catalog using the selected group of related queries to determine supplemental search results;

generating a user interface that includes the set of base search results along with the supplemental search results, wherein generating the user interface comprises:

adding, to a first area of the user interface, a first group of items that are relevant to the set of base search results, adding, to a second area of the user interface that is separate from the first area, a second group of items that are relevant to the supplemental search results, and including, in association with each of the second group of items, the generated explanation about each of the one or more groups of related queries; and providing the user interface to the device associated with the user, causing the device associated with the user to display the user interface.

* * * * *